US010125306B2

(12) United States Patent
Wang et al.

(10) Patent No.: US 10,125,306 B2
(45) Date of Patent: Nov. 13, 2018

(54) ASPHALTENE INHIBITION

(71) Applicant: CRODA, INC., Edison, NJ (US)

(72) Inventors: Min Ma Wang, Kennett Square, PA (US); Craig Michael Sungail, Chadds Ford, PA (US); Xin Chen, Hockessin, DE (US); Jonathan Harry Kaufman, Wilmington, DE (US)

(73) Assignee: Croda, Inc., Edison, NJ (US)

( * ) Notice: Subject to any disclaimer, the term of this patent is extended or adjusted under 35 U.S.C. 154(b) by 0 days.

(21) Appl. No.: 15/515,867

(22) PCT Filed: Sep. 17, 2015

(86) PCT No.: PCT/US2015/050669
§ 371 (c)(1),
(2) Date: Mar. 30, 2017

(87) PCT Pub. No.: WO2016/053634
PCT Pub. Date: Apr. 7, 2016

(65) Prior Publication Data
US 2017/0306215 A1    Oct. 26, 2017

Related U.S. Application Data

(60) Provisional application No. 62/058,822, filed on Oct. 2, 2014.

(51) Int. Cl.
C10G 75/00 (2006.01)
C09K 8/524 (2006.01)
C10G 75/04 (2006.01)
C10L 1/198 (2006.01)
C10L 10/04 (2006.01)

(52) U.S. Cl.
CPC .............. *C09K 8/524* (2013.01); *C10G 75/04* (2013.01); *C10L 1/198* (2013.01); *C10L 1/1983* (2013.01); *C10L 10/04* (2013.01); C10L 2230/08 (2013.01)

(58) Field of Classification Search
CPC ....... C09K 8/524; C10L 1/1983; C10L 10/04; C10L 2230/08
See application file for complete search history.

(56) References Cited

U.S. PATENT DOCUMENTS

| 3,639,242 A | 2/1972 | Le Suer |
| 3,990,979 A | 11/1976 | Brewster |
| 4,074,978 A * | 2/1978 | Panzer .................... C10L 1/143 44/281 |
| 4,173,540 A | 11/1979 | Lonstrup et al. |
| 4,414,035 A | 11/1983 | Newberry |
| 4,619,756 A | 10/1986 | Dickakian |
| 4,708,753 A | 11/1987 | Forsberg |
| 4,786,681 A | 11/1988 | Baker et al. |
| 4,866,140 A | 9/1989 | Gutierrez et al. |
| 4,876,018 A | 10/1989 | Karydas |
| 5,171,420 A | 12/1992 | Forester |
| 5,925,233 A | 7/1999 | Miller |
| 6,063,146 A | 5/2000 | Miller et al. |
| 6,313,336 B1 | 11/2001 | Le Coënt |
| 6,313,367 B1 | 11/2001 | Breen |
| 6,383,237 B1 | 5/2002 | Langer et al. |
| 6,402,934 B1 | 6/2002 | Chheda et al. |
| 6,478,904 B1 | 11/2002 | Nicolaas et al. |
| 6,946,524 B2 | 9/2005 | Breuer |
| 7,674,365 B2 | 3/2010 | Banavali et al. |
| 7,795,183 B2 | 9/2010 | Wilkes et al. |
| 7,833,407 B2 | 11/2010 | Brons et al. |
| 8,177,960 B2 | 5/2012 | Rouet et al. |
| 8,342,198 B2 | 1/2013 | Asomaning et al. |
| 8,425,761 B2 | 4/2013 | Wright et al. |
| 8,450,249 B2 | 5/2013 | Milligan et al. |
| 8,450,250 B2 | 5/2013 | Milligan et al. |
| 8,450,251 B2 | 5/2013 | Milligan et al. |
| 2006/0223945 A1 | 10/2006 | Hollingshurst et al. |
| 2010/0147739 A1 | 6/2010 | Levine et al. |
| 2011/0092393 A1 | 4/2011 | Faust |
| 2012/0004344 A1 | 1/2012 | Burden |
| 2012/0220807 A1 | 8/2012 | Miller |
| 2012/0241390 A1 | 9/2012 | Hassan et al. |
| 2014/0338254 A1* | 11/2014 | Feustel .................. C10G 75/04 44/398 |

FOREIGN PATENT DOCUMENTS

| CA | 2863267 | 8/2013 |
| CN | 102584502 A | 7/2012 |
| EP | 0263703 A2 | 4/1988 |

(Continued)

OTHER PUBLICATIONS

International Search Report and Written Opinion for International Application No. PCT/US2015/050669, dated Sep. 17, 2015—9 Pages.
Xiaojing et al., "Synthesis and Emulsion Characteristics of the Polyisobutylene Succinic Esters Based on Sorbitol", Chemical Industry Time, Nov. 11, 2011, 2 pages.
International Preliminary Report on Patentability for International Application No. PCT/US2015/050669, dated Apr. 4, 2017, 7 pages.

*Primary Examiner* — Randy Boyer
*Assistant Examiner* — Juan C Valencia
(74) *Attorney, Agent, or Firm* — RatnerPrestia

(57) ABSTRACT

A method of inhibiting asphaltene precipitation and/or deposition in a hydrocarbon, preferably crude oil, by adding to the hydrocarbon a polyester asphaltene dispersing agent which is the reaction product of an alk(en)yl substituted succinic anhydride wherein the average number of succinic groups per alk(en)yl group is less than 2.0, and at least one polyol.

18 Claims, No Drawings

(56) References Cited

FOREIGN PATENT DOCUMENTS

| | | |
|---|---|---|
| EP | 1357171 A2 | 10/2003 |
| EP | 1357172 A2 | 10/2003 |
| EP | 1359206 A1 | 11/2003 |
| EP | 1421255 A1 | 5/2004 |
| GB | 1099716 | 4/1965 |
| GB | 1523597 | 9/1978 |
| JP | 63223090 A | 9/1988 |
| WO | 2008074983 A1 | 6/2008 |
| WO | 2014123736 | 8/2014 |
| WO | 2014137800 | 9/2014 |

\* cited by examiner

ASPHALTENE INHIBITION

CROSS REFERENCE TO RELATED APPLICATIONS

This application is the National Stage filing of International Appln. No. PCT/US2015/050669, filed 17 Sep. 2015, which itself claims priority of U.S. Provisional Application No. 62/058,822, entitled ASPHALTENE INHIBITION, filed on 2 Oct. 2014, the contents of which applications are incorporated herein by reference in their entirety for all purposes.

FIELD OF INVENTION

The present invention relates to a method of inhibiting asphaltene precipitation and/or deposition in a hydrocarbon by the addition of a polyester asphaltene dispersant, particularly in crude oil; to such a hydrocarbon containing the dispersant; and to the dispersant.

BACKGROUND

Asphaltenes are present in crude oils. Asphaltenes include a large number of structures, such as high molecular weight fused aromatic compounds with heteroatoms. Asphaltenes are heterocyclic unsaturated macromolecules primarily of carbon and hydrogen, but also containing minor components such as sulphur, oxygen, nitrogen, and various heavy metals. Due to the complexity of their chemistry, asphaltenes can be defined as the fraction of crude oil which is insoluble in heptane.

In crude oil, asphaltenes are usually present as a colloidal dispersion which is stabilised by oil resins. Under normal reservoir conditions, asphaltenes are in equilibrium in the crude oil. As crude oil is produced, the equilibrium may be altered by a number of factors, such as by carbon dioxide injection, pH change, pressure drop, shear, streaming potential through porous media, etc., resulting in asphaltene flocculation or precipitation, and their deposition onto surfaces.

Asphaltene deposition can occur anywhere in the crude oil production life cycle, e.g. in the near-wellbore region including perforations, in the tubing, downhole and surface chokes, and surface flowlines. Predicting where asphaltene deposition might occur requires an understanding of the mechanisms for asphaltene deposition. The main causes are pressure decrease and injection of incompatible fluids in the reservoir rocks. Asphaltene deposition can significantly reduce well productivity, causing operational problems during production and processing of crude oils, damaging formations, and decreasing production.

Asphaltenes may also precipitate out and deposit during production, refining, transportation and storage of any products derived from crude oil, e.g. heavy heating oil or marine oil.

Heavy oils, which are often used for powering ships, comprise considerable amounts of asphaltenes. Precipitating out of asphaltenes can lead both to poor combustion and to difficulties during handling and storage of the fuel. Combustion disturbances due to precipitating out of asphaltenes are also observed in power stations operated with heavy oils.

Some oils comprise hydrocarbon waxes which precipitate out at low temperatures. Interactions between the precipitating out of wax and asphaltenes can increase the total amount of substance precipitated out and/or the rate of formation thereof.

Asphaltenes can be deposited in valves, pipes and conveying devices. On hot surfaces, such as, for example, heat exchangers, carbonization of these deposits can make their removal very difficult. The deposits reduce the efficiency of plants and in the worst case scenario can result in a complete blockage and stop in production, which results in high costs.

Asphaltene deposits can be removed by using solvents such as xylene or xylene mixtures which typically have undesirable health, safety, and environmental concerns. In general, prevention of asphaltene precipitation is more effective than attempting the removal of the precipitates or deposits. Precipitating out of asphaltenes can be reduced by adding a dispersing agent to the oil. If precipitates of asphaltenes have already formed, the addition of a dispersing agent can improve the effectiveness of any solvents used to remove the deposits.

Currently, several major chemical classes of asphaltene dispersants are commercially available and used in the oil industry. Examples of patent specifications describing the use of different asphaltene dispersants include;

U.S. Pat. No. 4,414,035 discloses the use of dodecylbenzene sulfonic acid (DDBSA) as an asphaltene dispersant. DDBSA is widely used in the industry for its effectiveness and low cost. However, there are environmental concerns about the use of DDBSA.

U.S. Pat. No. 5,925,233 describes the use of alkanesulfonic acid as an asphaltene dispersant. It can be used alone, or in formulation with alkyl-formaldehyde resin, oxyalkylated amines, or wax-dispersing agents.

U.S. Pat. No. 6,946,524 discloses a method for producing polyester amides based on polyisobutylene succinic anhydride and mono-ethanolamine and the use of them as a stabilization additive for crude oil.

U.S. Pat. No. 6,313,367 describes the use of esters derived from polyhydric alcohols and carboxylic acids (such as sorbitan mono-oleates) as asphaltene dispersants.

US2011/0092393 discloses the use of hydrophobically modified non-ionic polysaccharides as viscosity reducers in petroleum applications, such as recovery and transport of heavy petroleum oils. The polysaccharides are modified with, for sample, hydrophobically end-capped 2-hydroxyethyl groups.

US2012/0220807 describes polymer asphaltene dispersants derived from the polymerisation of α-olefin and vinyl pyrrolidinone.

US2012/0004344 discloses the use of acrylate copolymers of 2-ethylhexyl methacrylate and n-butyl acrylate as an asphaltene drag reducing additive for crude oil.

Despite the wide number of materials disclosed as having asphaltene dispersancy properties, there is still a need for environmentally-friendly asphaltene dispersants for oil and gas drilling applications which have improved properties over existing materials such as reducing (i) the amount of precipitate formed, (ii) the speed of precipitate formation, (iii) the particle size of the precipitate, and/or (iv) the tendency of the precipitate to be deposited on surfaces.

SUMMARY OF THE INVENTION

We have surprisingly discovered asphaltene dispersants and method of use thereof which overcome or significantly reduce at least one of the aforementioned problems.

Accordingly, the present invention provides a method of inhibiting asphaltene precipitation and/or deposition in a hydrocarbon comprising adding to the hydrocarbon an effective amount of a polyester asphaltene dispersing agent obtainable by reacting an alk(en)yl substituted succinic anhydride wherein the average number of succinic groups per alk(en)yl group is less than 2.0, with at least one polyol.

The invention also provides a composition comprising a diluent and a polyester asphaltene dispersing agent obtainable by reacting an alk(en)yl substituted succinic anhydride wherein the average number of succinic groups per alk(en)yl group is less than 2.0, with at least one polyol.

The invention further provides crude oil or a product derived therefrom comprising asphaltene and an effective amount of a polyester asphaltene dispersing agent obtainable by reacting an alk(en)yl substituted succinic anhydride wherein the average number of succinic groups per alk(en)yl group is less than 2.0, with at least one polyol.

The invention still further provides a polyester which is the reaction product of an alk(en)yl substituted succinic anhydride wherein the average number of succinic groups per alk(en)yl group is less than 2.0, and at least one polyol.

The invention even further provides the use of a polyester obtainable by reacting an alk(en)yl substituted succinic anhydride wherein the average number of succinic groups per alk(en)yl group is less than 2.0, with at least one polyol, to disperse asphaltene.

The alk(en)yl group of the alk(en)yl substituted succinic anhydride used herein is preferably an alkenyl group. The alk(en)yl, preferably alkenyl, group is suitably a polyolefin obtained by polymerizing a monoolefin, preferably containing in the range from 2 to 6, more preferably 3 to 4 carbon atoms. Suitable monoolefins include ethylene, propylene, butylene, isobutylene and mixtures thereof. Isobutylene is particularly preferred. Thus, polyisobutylene (PIB) is a particularly preferred alk(en)yl group and polyisobutylene succinic anhydride (PIBSA) is a particularly preferred alk(en)yl substituted succinic anhydride.

In one embodiment, the alk(en)yl group is a C6 to C20, preferably C8 to C18 alkene. Specific examples include octene, dodecene and octadecene, which may be linear or branched. Suitable alk(en)yl substituted succinic anhydrides are octene succinic anhydride (OSA), branched dodecene succinic anhydride (DDSA), and octadecene succinic anhydride (OSA).

The alk(en)yl group is suitably reacted with maleic anhydride, maleic acid, or mono- or di-C1 to C6 alkyl or alkenyl maleates, e.g. dibutyl maleate, preferably with maleic anhydride, to form the alk(en)yl substituted succinates using methods well known in the art.

The alk(en)yl group, preferably PIB, suitably has an average molecular weight, preferably Mn (measured as described herein), in the range from 100 to 15,000, preferably 500 to 3,000, more preferably 750 to 1,500, particularly 850 to 1,100, and especially 900 to 1,000.

The alk(en)yl group suitably comprises in the range from 5 to 180, preferably 10 to 55, more preferably 13 to 30, particularly 15 to 20, and especially 16 to 18 monomer units, preferably monoolefin units, and particularly isobutylene units.

There are at least 2 different grades of commercially available PIB, conventional PIB and highly reactive PIB. Highly reactive PIB has a high vinylidene content characterised by a high concentration of terminal double bonds, suitably greater than 70%, and preferably greater than 80% and up to 100% by weight. Highly reactive PIB is preferably used herein.

The average number of succinic groups per alk(en)yl group, preferably PIB, is less than 2.0 in the alk(en)yl substituted succinic anhydride used herein. The average number of succinic groups per alk(en)yl group, preferably PIB, is suitably in the range from 0.3 to 1.8, preferably 0.6 to 1.5, more preferably 0.8 to 1.3, particularly 0.9 to 1.1, and especially 0.95 to 1.05.

The alk(en)yl substituted succinic anhydride is obtainable by reacting maleic anhydride, maleic acid, or mono- or di-C1 to C6 alkyl or alkenyl maleates, e.g. dibutyl maleate, preferably maleic anhydride, with monoolefin, preferably PIB, at a molar ratio of suitably 0.3 to 1.8:1, preferably 0.6 to 1.5:1, more preferably 0.8 to 1.3:1, particularly 0.9 to 1.1:1, and especially 0.95 to 1.05:1.

The polyol starting material used herein to the form the polyester asphaltene dispersing agent preferably comprises in the range from 2 to 8, more preferably 4 to 6, and particularly 6 hydroxyl groups. Suitable polyols include ethylene glycol, propylene glycol, glycerol and polyglycerol (e.g. containing up to 6, preferably up to 3 glycerol units), C4 polyols such as threitol and erythritol, C5 polyols such as inositol, arabitol, ribitol, xylitol and pentaerythritol, C6 polyols such as galactitol, fucitol, iditol, trimethylolpropane, mannitol, sorbitol and derived materials such as sorbitan, and C12 polyols such as sucrose. The C4 to C6 polyols may be the reduced or hydrogenated forms of the corresponding tetrose, pentose and hexose sugars.

Preferably the polyol is selected from the group consisting of glycerol, polyglycerol, pentaerythritol, trimethylolpropane, mannitol, sorbitol, sorbitan, sucrose and mixtures thereof, more preferably selected from the group consisting of pentaerythritol, mannitol, sorbitol, sorbitan and mixtures thereof, particularly selected from the group consisting of mannitol, sorbitol, sorbitan and mixtures thereof, and especially selected from the group consisting of sorbitol, sorbitan and mixtures thereof. In one particularly preferred embodiment the polyol comprises, consists essentially of, or consists of sorbitol.

The molar ratio of alk(en)yl substituted succinic anhydride, preferably PIBSA, reacted with polyol, preferably sorbitol, to form the polyester dispersing agent is suitably in the range from 0.5 to 10:1, preferably 0.8 to 6:1, more preferably 1.1 to 4:1, particularly 1 to 3:1, and especially 1.8 to 2.2:1.

The polyester suitably has a number average molecular weight (Mn) (measured as described herein) in the range from 1,500 to 500,000, preferably 2,000 to 50,000, more preferably 2,500 to 15,000, particularly 3,000 to 10,000, and especially 3,500 to 5,000.

The polyester suitably has a weight average molecular weight (Mw) (measured as described herein) in the range from 3,000 to 1,000,000, preferably 5,000 to 100,000, more preferably 7,000 to 40,000, particularly 8,000 to 20,000, and especially 9,000 to 12,000.

The polyester suitably comprises on average at least 3 ester groups, preferably in the range from 4 to 100, preferably 5 to 50, more preferably 6 to 30, particularly 6.5 to 15, and especially 7 to 10 ester groups.

The average number of alk(en)yl, preferably RIB, groups in the polyester is suitably in the range from 2 to 30, preferably 2.5 to 20, more preferably 3 to 15, particularly 3.5 to 10, and especially 4 to 5.

The average number of succinic groups in the polyester is suitably at least 2, preferably in the range from 2.5 to 30, more preferably 3 to 15, particularly 3.5 to 10, and especially 4 to 5.

The average number of reaction residues of alk(en)yl substituted succinic anhydride groups, preferably PIBSA, in the polyester is suitably in the range from 2 to 30, preferably 2.5 to 20, more preferably 3 to 15, particularly 3.5 to 10, and especially 4 to 5.

The average number of reaction residues of polyol groups, preferably sorbitol, in the polyester is suitably in the range from 1 to 30, preferably 1.5 to 20, more preferably 2 to 10, particularly 2.5 to 6, and especially 3 to 4.

The polyester preferably has an acid value (measured as described herein) in the range from 1 to 50, more preferably 5 to 30, particularly 10 to 25, and especially 15 to 20 mg KOH/g.

The polyester preferably has a hydroxyl value (measured as described herein) in the range from 10 to 100, more preferably 20 to 50, particularly 25 to 45, and especially 30 to 40 mg KOH/g.

The polyester preferably has a saponification value (measured as described herein) in the range from 5 to 150, more preferably 20 to 100, particularly 30 to 80, and especially 40 to 60 mg KOH/g.

The polyester dispersing agent may be produced by heating together the alk(en)yl substituted succinic anhydride and polyol described above under conditions which are conventional for the preparation of such a condensation polymer. Typically the starting materials are heated at a temperature of around 100 to 120° C. to form a half-ester intermediate, followed by heating at an elevated temperature of around 140 to 180° C. for polymerization to occur and the acid value to fall to the desired level.

The polyol suitable for the preparation of such condensation polymer may be used either neat (undiluted) or diluted in water for ease of material handling. If the polyol is supplied in water solution, such as 80% sorbitol in water solution, the dilution water in polyol is preferably stripped off at an elevated temperature and/or with vacuum before mixing with the alk(en)yl substituted succinic anhydride.

For better control of the condensation polymerization, a diluent medium may be added to reduce the viscosity of the reaction mix. The diluent is often added before the condensation polymerization reaction commences. The diluent useful for the reaction includes many hydrocarbon distillates, such as a paraffinic oil.

The hydrocarbon, preferably oil, to be treated, by the addition of the polyester asphaltene dispersing agent, for inhibition of asphaltene precipitation and/or deposition can be crude oil or any product derived from crude oil, e.g. heavy heating oil or marine oil. In one embodiment, the crude oil may be treated when at least partially located within an oil well, an oil reservoir, at least one component of a crude oil distribution apparatus, such as a pipeline, at least one component of a crude oil refining apparatus (e.g. a crude unit preheat train, a crude unit side-stream pump around(s), and/or a crude unit feed to either the vacuum tower or a catalytic cracking unit) or combination thereof. Products derived from crude oil may be treated during production, refining, transportation and/or storage thereof.

The hydrocarbon is suitably an asphaltene-containing oil. The oil may comprise, in thermodynamic equilibrium, asphaltenes, maltenes and/or resins. The introduction of the polyester asphaltene dispersing agent into the hydrocarbon can result in maintenance of the thermodynamic equilibrium, thus preventing asphaltene precipitation or deposition, or nearly maintaining thermodynamic equilibrium, such that precipitation or deposition is significantly reduced.

The hydrocarbon, suitably oil, preferably comprises at least 1%, more preferably in the range from 2 to 30%, particularly 4 to 25%, and especially 5 to 20% by weight of asphaltenes based on the total weight of the mixture.

The polyester asphaltene dispersing agent defined herein may be used in neat (undiluted) form, but is suitably added to, or applied to, the hydrocarbon in a diluent medium. The composition comprises, consists essentially of, or consists of, diluent medium and polyester asphaltene dispersing agent.

The diluent medium preferably comprises, consists essentially of, or consists of, one or more mineral oils, more preferably one or more paraffinic oils. In one preferred embodiment, the diluent medium is not an aromatic oil or solvent. The diluent medium comprises preferably less than 10% by weight, more preferably less than 5% by weight, particularly less than 1% by weight of aromatic materials, and especially substantially no aromatic materials.

The concentration of the polyester in the diluent medium is suitably in the range from 10 to 90%, preferably 20 to 80%, more preferably 30 to 70%, particularly 40 to 60%, and especially 45 to 55% by weight based on the total weight of the composition.

The diluent containing polyester composition is suitably added to the hydrocarbon, preferably crude oil, at a dosage rate in the range from 5 to 5,000 ppm, preferably 20 to 1,000 ppm, more preferably 30 to 300 ppm, particularly 40 to 200 ppm, and especially 50 to 100 ppm.

The concentration of the polyester dispersing agent present in the hydrocarbon, preferably oil, is suitably in the range from 5 to 1,000 ppm, preferably 10 to 200 ppm, more preferably 15 to 100 ppm, particularly 20 to 75 ppm, and especially 25 to 50 ppm.

The polyester dispersing agent described herein surprisingly has improved asphaltene dispersing property and in one embodiment suitably has an asphaltene dispersing value (measured as described herein) at a concentration of 25 ppm in the hydrocarbon, preferably heavy Canadian crude oil having an API gravity of 15, of at least 90%, preferably at least 95%, more preferably at least 97%, particularly at least 98%, and especially at least 99%.

In one embodiment, the polyester dispersing agent suitably has an asphaltene dispersing value (measured as described herein) at a concentration of 50 ppm in the hydrocarbon, preferably heavy Canadian crude oil having an API gravity of 15, of at least 99.0%, preferably at least 99.5%, more preferably at least 99.7%, particularly at least 99.8%, and especially at least 99.9%.

In this specification the following test methods were used:
(i) Asphaltene Dispersancy The separation of asphaltene from crude oil was measured using a Turbiscan method based on ASTM D7061-06 (measured at 880 nm instead of 850 nm; at a 0.1 mm step instead of a 0.04 mm step; and at 30° C. instead of at ambient temperature (20 to 25° C.)). The tests were run on a Turbiscan (Formulaction Inc.) which measured the percent of light transmitted through the sample from 10 mm to 50 mm height on the sample bottle at 1 minute intervals. Measurements were taken every minute, from 0 to 15 minutes (a total of 16 data points). The data recorded was the average transmittance from 10 mm to 50 mm height on the sample.

The separability number is the average value of the recorded data points for a single run. The separability numbers for different runs were not directly compared to each other because of any variance in the samples (which were run over many days). The percent of asphaltene dispersed (asphaltene dispersing value) was calculated using the formula;

Percent of Asphaltene Dispersed=[(Blank Separability Number−Dispersant Separability Number)/ (Blank Separability Number)]×100

This value takes into account any slight variance in the blank for every set of runs. A new blank sample was measured daily.

Table 1 below shows the amounts of heptane, dispersant solution, and crude oil in each sample tested at various dispersant use levels. The dispersant solution was 99% toluene, and 1% asphaltene dispersant (polyester product in paraffinic oil produced in Examples 1 to 13). The crude oil was a heavy Canadian crude oil having an API gravity of 15 containing 19% by weight of water. The crude oil was treated with the addition of a demulsifier, and the resulting water layer was removed. The water content of the remaining crude oil layer was less than 1% by weight. The crude oil was then diluted in toluene at a 1:6 weight ratio to dissolve any asphaltenes. Heptane was then added to precipitate the asphaltenes so that the effectiveness of the dispersing agents could be determined.

TABLE 1

| Dispersant Concentration | 0 (Blank) | 12.5 ppm | 25 ppm | 50 ppm | 100 ppm | 200 ppm |
|---|---|---|---|---|---|---|
| Heptane | 23 ml | 22.97 ml | 22.94 ml | 22.88 ml | 22.75 ml | 22.5 ml |
| Dispersant Solution | 0 | 31 µl | 62 µl | 125 µl | 250 µl | 500 µl |
| Crude Oil in Toluene | 2 ml | 2 ml | 2 ml | 2 ml | 2 ml | 2 ml |

(ii) Molecular Weight

Molecular weights number average (Mn) and weight average (Mw) were determined by Gel Permeation Chromatography (GPC). The polyester products were dissolved in tetrahydrofuran (THF) to prepare GPC samples. 15 µl of solution containing 20 mg/ml of sample in THF was injected in the GPC, equipped with 2× Mini-Mix E columns (length 25 cm, i.d 4.6 mm) and 1× Mini-Mix C column (length 25 cm, i.d 4.6 mm), an Agilent 1100 pump and refractive index detector. The GPC columns were calibrated with polystyrene standards.

(iii) Acid Value, Hydroxyl Value, Saponification Value

The acid value, hydroxyl value, and saponification value of the polyester product were measured using standard titration methods commonly used in the industry as follows:

The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

The acid value is defined as the number of mg of potassium hydroxide required to neutralise the free acids in 1 g of sample, and was measured by direct titration with a standard potassium hydroxide solution.

The saponification (or SAP) value is defined as the number of mg of potassium hydroxide required for the complete saponification of 1 g of sample, and was measured by saponification with a standard potassium hydroxide solution, followed by titration with a standard hydrochloric acid solution.

The invention is illustrated by the following non-limiting examples.

EXAMPLE 1

36.7 grams of sorbitol (80% solution in water, ex Corn Product) and 375 grams of 100 N paraffinic oil (ex Ergon) were mixed in a 1 liter flask, and heated to 90° C. A partial vacuum was gradually applied to the flask to remove water. Then, 338.3 grams of an undiluted HR-PIBSA (Dovermulse H1000 from Dover Chemicals) was added into the flask. The molar ratio of HR-PIBSA to sorbitol (on dry basis) was 2:1. The reaction mixture was first heated to 90 to 110° C. with agitation, and held for 1 to 2 hours to form a PIBSA sorbitol half-ester intermediate. The PIBSA sorbitol reaction mixture was heated further to 150 to 170° C. with agitation, and held for up to 5 hours. Polyester was formed through condensation polymerization between the carboxylic acid group from the PIBSA moiety and hydroxyl group of the sorbitol moiety. As the polymerization progresses, the acid number and hydroxyl number of the polyester product decreased. The polymerization was monitored through the measurement of the acid number. The formation of ester was confirmed by FTIR and NMR spectra of the product. Two polyester products were taken at different levels of condensation polymerization which were approximately 50% by weight solutions in paraffinic oil, and had acid values of 24.0 mg KOH/g and 18.0 mg KOH/g.

EXAMPLE 1A 37 grams of sorbitol (80% solution in water, ex Corn Product) and 375 grams of LPA®-170 Solvent (ex Sasol) were mixed in a 1 liter flask, and heated to 90-100° C. A partial vacuum was gradually applied to the flask to remove water to less than 0.2%. Then, 338 grams of an undiluted HR-PIBSA (Dovermulse H1000 from Dover Chemicals) was added into the flask. The molar ratio of HR-PIBSA to sorbitol (on dry basis) was 2:1. The reaction mixture was first heated to 120° C. with agitation, and held for 2 hours to form a PIBSA sorbitol half-ester intermediate. The PIBSA sorbitol reaction mixture was heated further to 160 to 180° C. with agitation, and held for up to 5 hours. Polyester was formed through condensation polymerization between the carboxylic acid group from the PIBSA moiety and hydroxyl group of the sorbitol moiety. As the polymerization progresses, the acid number and hydroxyl number of the polyester product decreased. The polymerization was monitored through the measurement of the acid number. The formation of ester was confirmed by FTIR and NMR spectra of the product. The polyester product was approximately 50% by weight solutions in a isoparaffinic oil, and had acid value of 19.8 mg KOH/g, viscosity at 25° C. of 226 cP, and pour point of −50° C.

EXAMPLE 2

The procedure of Example 1 was repeated except that 66.8 grams of sorbitol and 308.2 grams of an undiluted HR-PIBSA were used. The molar ratio of HR-PIBSA to sorbitol (on dry basis) was 1:1. The polyester product had an acid number of 20.0 mg KOH/g.

EXAMPLE 3

The procedure of Example 1 was repeated except that 25.3 grams of sorbitol and 349.7 grams of an undiluted HR-PIBSA were used. The molar ratio of HR-PIBSA to sorbitol (on dry basis) was 3:1. The polyester product had an acid number of 21.0 mg KOH/g.

EXAMPLE 4

The procedure of Example 1 was repeated except that sorbitan (ex Corn Product, New Castle, Del., USA) was used instead of sorbitol. The respective quantities used were 27.2 grams of sorbitan and 347.8 grams of an undiluted HR-PIBSA. The molar ratio of HR-PIBSA to sorbitan (on dry basis) was 2:1. The polyester product had an acid number of 25.0 mg KOH/g.

EXAMPLE 5

The procedure of Example 4 was repeated except that 50.7 grams of sorbitan and 324.3 grams of an undiluted HR-PIBSA were used. The molar ratio of HR-PIBSA to sorbitan (on dry basis) was 1:1. The polyester product had an acid number of 21.0 mg KOH/g.

EXAMPLE 6

The procedure of Example 1 was repeated except that trimethylolpropane (TMP) (ex Perstorp) was used instead of sorbitol, no partial vacuum was applied and polymerization at 150 to 170° C. was for up to 2 hours. The respective quantities used were 29.4 grams of TMP and 345.6 grams of an undiluted HR-PIBSA. The molar ratio of HR-PIBSA to TMP (on dry basis) was 1.5:1. The polyester product had an acid number of 37.0 mg KOH/g.

EXAMPLE 7

The procedure of Example 6 was repeated except that glycerol was used instead of TMP. The respective quantities used were 20.7 grams of glycerol and 354.3 grams of an undiluted HR-PIBSA. The molar ratio of HR-PIBSA to glycerol (on dry basis) was 1.5:1. The polyester product had an acid number of 22.0 mg KOH/g.

EXAMPLE 8

The procedure of Example 6 was repeated except that polyglycerol-3 (ex Solvay) was used instead of TMP. The respective quantities used were 31.4 grams of polyglycerol-3 and 343.6 grams of an undiluted HR-PIBSA. The molar ratio of HR-PIBSA to polyglycerol-3 (on dry basis) was 2.5:1. The polyester product had an acid number of 23.0 mg KOH/g.

EXAMPLE 9

The procedure of Example 1 was repeated except that sucrose (ex Cargill) was used instead of sorbitol, and polymerization at 150 to 170° C. was for up to 3 hours. The respective quantities used were 28.3 grams of sucrose and 346.7 grams of an undiluted HR-PIBSA. 2 grams of NaOH 50% solution was also added to the sucrose and paraffinic oil. The molar ratio of HR-PIBSA to sucrose (on dry basis) was 4:1. The polyester product had an acid number of 19.1 mg KOH/g.

EXAMPLE 10

The procedure of Example 9 was repeated except that polymerization at 150 to 170° C. was for up to 6 hours, and 52.6 grams of sucrose and 322.4 grams of an undiluted HR-PIBSA were used. The molar ratio of HR-PIBSA to sucrose (on dry basis) was 2:1. The polyester product had an acid number of 35.8 mg KOH/g.

EXAMPLE 11

The procedure of Example 1 was repeated except that pentaerythritol was used instead of sorbitol, and polymerization at 150 to 170° C. was for up to 7 hours. The respective quantities used were 23.0 grams of pentaerythritol and 352 grams of an undiluted HR-PIBSA. The molar ratio of HR-PIBSA to pentaerythritol (on dry basis) was 2:1. Three polyester products were produced having acid numbers of 24.8, 19.0 and 16.6 mg KOH/g.

EXAMPLE 12

The procedure of Example 11 was repeated except that 43.0 grams of pentaerythritol and 332 grams of an undiluted HR-PIBSA were used. The molar ratio of HR-PIBSA to pentaerythritol (on dry basis) was 1:1. Two polyester products were produced having acid numbers of 12.5 and 19.0 mg KOH/g.

EXAMPLE 13

The procedure of Example 11 was repeated except that 15.5 grams of pentaerythritol and 360 grams of an undiluted HR-PIBSA were used. The molar ratio of HR-PIBSA to pentaerythritol (on dry basis) was 3:1. The polyester product had an acid number of 21.1 mg KOH/g.

EXAMPLE 14

The polyester dispersant products produced in Examples 1 to 13 were subjected to the asphaltene dispersancy test described herein and the results at concentrations of 25 ppm and 50 ppm of dispersant are given in Table 2.

TABLE 2

| Example Number | Acid Number (mg KOH/g) | Asphaltene Dispersed | |
|---|---|---|---|
| | | 25 ppm Dispersant | 50 ppm Dispersant |
| 1 | 24.0 | 99.6% | 98.8% |
| 1 | 18.0 | 98.5% | 99.9% |
| 2 | 20.0 | 98.7% | 99.9% |
| 3 | 21.0 | 96.8% | 99.5% |
| 4 | 25.0 | 93.4% | 100% |
| 5 | 21.0 | 95.1% | 100% |
| 6 | 37.0 | — | 90.7% |
| 7 | 22.0 | 89.0% | 99.8% |
| 8 | 23.0 | 35.6% | 98.7% |
| 9 | 19.1 | 82.0% | 99.9% |
| 10 | 35.8 | 56.9% | 96.5% |
| 11 | 24.8 | 97.7% | 100% |
| 11 | 19.0 | 93.1% | 99.8% |
| 11 | 16.6 | 94.5% | 99.4% |
| 12 | 12.5 | 98.7% | 100% |
| 12 | 19.0 | 100% | 99.9% |
| 13 | 21.1 | 90.4% | 99.7% |

EXAMPLE 15

This is a comparative example not according to the invention. Two existing commercially available asphaltene dispersants, namely dodecylbenzene sulphonic acid (DD- BSA) and sorbitan mono-oleate (SMO) were used in the asphaltene dispersancy test described herein, and the results at concentrations of 25 ppm, 50 ppm and 200 ppm of dispersant are given in Table 3.

TABLE 3

| Asphaltene Dispersant | Asphaltene Dispersed | | |
|---|---|---|---|
| | 25 ppm Dispersant | 50 ppm Dispersant | 200 ppm Dispersant |
| DDBSA | 6.3% | 21.2% | 57.2% |
| SMO | 18.6% | 14.0% | 86.5% |

The above examples illustrate the improved properties of polyester asphaltene dispersants, and use thereof, according to the present invention.

The invention claimed is:

1. A method of inhibiting asphaltene precipitation and/or deposition in a hydrocarbon comprising adding to the hydrocarbon an effective amount of a polyester asphaltene dispersing agent obtained by reacting an alk(en)yl substituted succinic anhydride wherein the average number of succinic groups per alk(en)yl group is less than 2.0, with at least one polyol, wherein the molar ratio of alk(en)yl substituted succinic anhydride to polyol is 1.8 to 10:1.

2. The method according to claim 1 wherein the alk(en)yl group is a polyolefin.

3. The method according to claim 1 wherein the alk(en)yl group has an average molecular weight of 750 to 1,500.

4. The method according to claim 1 wherein the average number of succinic groups per alk(en)yl group is 0.3 to 1.8.

5. The method according to claim 4 wherein the average number of succinic groups per alk(en)yl group is 0.8 to 1.3.

6. The method according to claim 1 wherein the polyester has an average molecular weight Mn of 2,500 to 15,000 and/or an average molecular weight Mw of 7,000 to 40,000.

7. The method according to claim 1 wherein the polyester comprises the reaction residue of at least 2 alk(en)yl substituted succinic anhydride groups.

8. The method according to claim 1 wherein the polyester comprises 2 to 30 alk(en)yl groups.

9. The method according to claim 1 wherein the polyester comprises the reaction residue of 2 to 30 polyol groups.

10. The method according to claim 1 wherein the polyol is sorbitol.

11. The method according to claim 1 wherein the hydrocarbon comprises 5 to 1,000 ppm of the polyester.

12. A composition comprising a diluent medium and a polyester asphaltene dispersing agent obtained by reacting an alk(en)yl substituted succinic anhydride wherein the average number of succinic groups per alk(en)yl group is less than 2.0, with at least one polyol, wherein the molar ratio of alk(en)yl substituted succinic anhydride to polyol is 1.8 to 10:1.

13. Crude oil or a product derived therefrom comprising asphaltene and an effective amount of a polyester asphaltene dispersing agent obtained by reacting an alk(en)yl substituted succinic anhydride wherein the average number of succinic groups per alk(en)yl group is less than 2.0, with at least one polyol, wherein the molar ratio of alk(en)yl substituted succinic anhydride to polyol is 1.8 to 10:1.

14. A polyester which is the reaction product of an alk(en)yl substituted succinic anhydride wherein the average number of succinic groups per alk(en)yl group is less than 2.0, and at least one polyol, wherein the molar ratio of alk(en)yl substituted succinic anhydride to polyol is 1.8 to 10:1.

15. The method according to claim 1 wherein the polyester has an asphaltene dispersing value of at least 95% at a concentration of 25 ppm.

16. The polyester according to claim 14 wherein the molar ratio of the alk(en)yl substituted succinic anhydride to polyol is 1.8 to 6:1.

17. The polyester according to claim 14 wherein the molar ratio of the alk(en)yl substituted succinic anhydride to polyol is 1.8 to 4:1.

18. The method according to claim 1 wherein the alk(en)yl group is polyisobutylene.

* * * * *